United States Patent
Saeedkia et al.

(10) Patent No.: US 11,060,859 B2
(45) Date of Patent: Jul. 13, 2021

(54) METHODS AND SYSTEMS FOR THICKNESS MEASUREMENT OF MULTI-LAYER STRUCTURES

(71) Applicant: TeTechS Inc., Waterloo (CA)

(72) Inventors: Daryoosh Saeedkia, Waterloo (CA); Alexander William Strong, Waterloo (CA); Roberto Bravo, Guelph (CA)

(73) Assignee: TeTechS Inc., Waterloo (CA)

( * ) Notice: Subject to any disclaimer, the term of this patent is extended or adjusted under 35 U.S.C. 154(b) by 127 days.

(21) Appl. No.: 16/157,737

(22) Filed: Oct. 11, 2018

(65) Prior Publication Data

US 2019/0041200 A1    Feb. 7, 2019

Related U.S. Application Data

(63) Continuation-in-part of application No. 16/084,099, filed as application No. PCT/CA2017/050409 on Apr. 4, 2017, now abandoned.

(60) Provisional application No. 62/317,890, filed on Apr. 4, 2016.

(51) Int. Cl.
 G01B 15/02 (2006.01)
 G01B 11/06 (2006.01)

(52) U.S. Cl.
 CPC .......... G01B 15/02 (2013.01); G01B 11/0625 (2013.01)

(58) Field of Classification Search
 CPC .......................... G01B 15/02; G01B 11/0625
 See application file for complete search history.

(56) References Cited

U.S. PATENT DOCUMENTS

| | | | |
|---|---|---|---|
| 6,828,558 B1 | 12/2004 | Arnone et al. | |
| 7,876,423 B1 | 1/2011 | Roth | |
| 7,933,027 B1 | 4/2011 | Roth | |
| 8,513,608 B2 | 8/2013 | Ohtake et al. | |

(Continued)

FOREIGN PATENT DOCUMENTS

| | | | |
|---|---|---|---|
| EP | 2722639 A1 | 4/2014 | |
| JP | 2722639 * | 4/2014 | ............. G01B 11/06 |

OTHER PUBLICATIONS

International Searching Authority, "International Search Report end the written opinion for PCT/CA2017/050409", dated Aug. 17, 2017.

(Continued)

*Primary Examiner* — Marc Anthony Armand
(74) *Attorney, Agent, or Firm* — Bereskin & Parr LLP

(57) ABSTRACT

A system and method for measuring thicknesses of layers of a multi-layered structure. The method includes generating a terahertz wave pulse, transmitting the terahertz wave pulse to a multi-layered structure having multiple layers of materials, receiving reflected terahertz wave pulses reflected by boundaries between the multiple layers as the terahertz wave pulse penetrates the structure, and processing the reflected terahertz wave pulses to: (i) determine whether the reflected terahertz wave pulses have a pulse width overlap; (ii) in response to determining that a pulse width overlap exists, generate modified reflected terahertz wave pulses; measure the time delays associated with each of the modified reflected terahertz pulses and (ii) determine a thickness of each of the multiple layers of materials based upon the time delay and a material refractive index of each of the materials.

19 Claims, 14 Drawing Sheets

(56) References Cited

U.S. PATENT DOCUMENTS

| | | |
|---|---|---|
| 9,146,390 B2 | 9/2015 | Kamata |
| 9,234,934 B2 | 1/2016 | Nakanishi et al. |
| 9,766,132 B2 | 9/2017 | Takase et al. |
| 10,041,785 B2 | 8/2018 | Van Mechelen |
| 2004/0065832 A1 | 4/2004 | Cluff et al. |
| 2008/0037031 A1 | 2/2008 | Cole et al. |
| 2010/0195090 A1 | 8/2010 | Ohtake |
| 2010/0195092 A1 | 8/2010 | Ohtake |
| 2011/0198501 A1 | 8/2011 | Ouchi et al. |
| 2013/0037721 A1 | 2/2013 | Ouchi |
| 2013/0309445 A1 | 11/2013 | Nukaga et al. |
| 2014/0127707 A1 | 5/2014 | Ouchi et al. |
| 2014/0146306 A1 | 5/2014 | Kubota |
| 2014/0264038 A1 | 9/2014 | Kajiki et al. |
| 2014/0291524 A1 | 10/2014 | Kubota et al. |
| 2014/0322429 A1 | 10/2014 | Markl et al. |
| 2015/0129768 A1 | 5/2015 | Koizumi et al. |
| 2015/0268030 A1 | 9/2015 | White et al. |
| 2016/0116401 A1 | 4/2016 | Hunt et al. |
| 2016/0117426 A1* | 4/2016 | Savard ................ G01F 23/0069 703/2 |
| 2016/0377803 A1 | 12/2016 | Wu et al. |
| 2017/0023469 A1 | 1/2017 | Zimdars et al. |
| 2017/0329127 A1 | 11/2017 | Liu et al. |

OTHER PUBLICATIONS

Examiner's Report for Canadian Application 3,017,393, dated Oct. 19, 2018.

\* cited by examiner

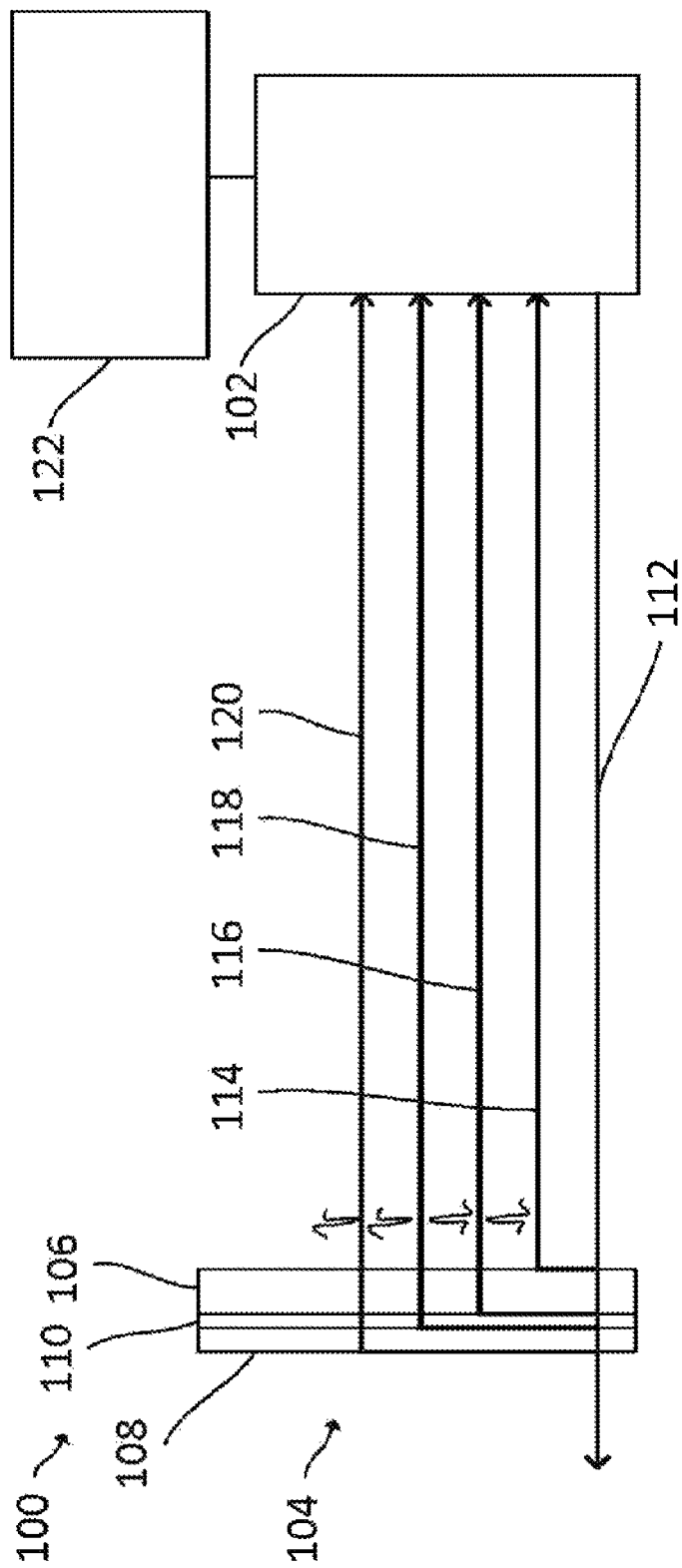
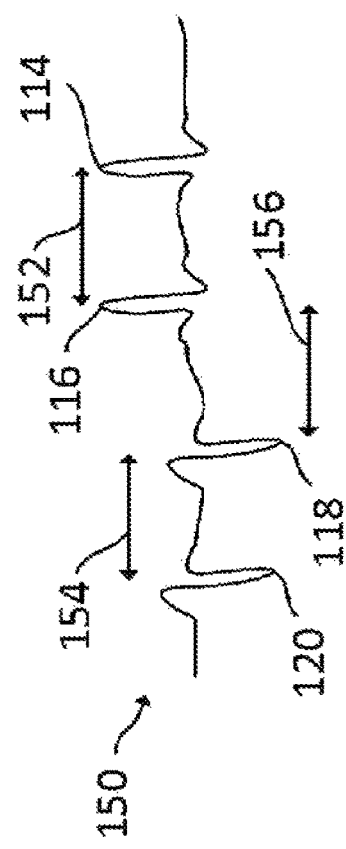
Figure 1A
Figure 1B

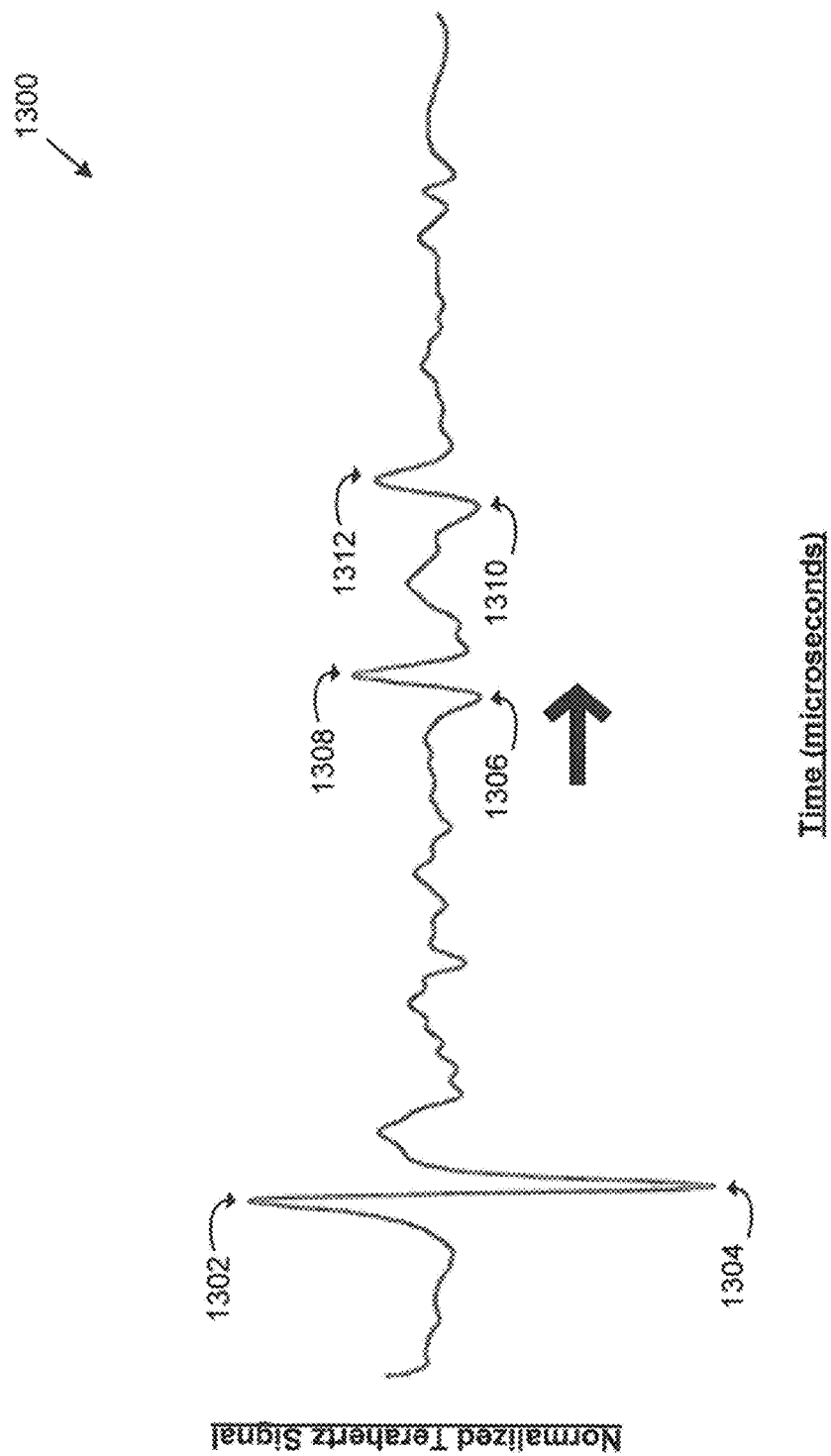

METHODS AND SYSTEMS FOR THICKNESS MEASUREMENT OF MULTI-LAYER STRUCTURES

CROSS-REFERENCE TO RELATED APPLICATIONS

This application is a continuation-in-part of U.S. patent application Ser. No. 16/084,099, which was entered under 35 U.S.C. 371 as the national stage of PCT/CA2017/050409, which itself was filed on Apr. 4, 2017, entitled "METHODS AND SYSTEMS FOR THICKNESS MEASUREMENT OF MULTI-LAYER STRUCTURES", and claimed the benefit of U.S. Provisional Patent Application Ser. No. 62/317,890 filed on Apr. 4, 2016, entitled "METHODS AND APPARATUS FOR THICKNESS MEASUREMENT OF MULTI-LAYER STRUCTURES", the entire contents of which are hereby incorporated by reference for all purposes.

TECHNICAL FIELD

The embodiments disclosed herein relate to methods for measuring thickness of individual layers in multi-layer structures using terahertz waves.

INTRODUCTION

Non-contact, non-invasive multi-layer thickness measurement of plastic, rubber, ceramic, composite materials, foam, web, paper, and sheet is one of the major challenges found in many industries, such as plastic manufacturing, hose and tubes, paper, plastic bottles and preforms manufacturing.

Conventional technology to measure the wall thickness of transparent plastic bottles, and preforms, uses infrared interferometry which cannot measure opaque materials. Another conventional method uses Hall Effect (e.g., Magna-mike) measurement probes. Measurements are made when the magnetic probe is held or scanned on one side of the test material and a small target ball (or disk or wire) is placed on the opposite side of the test material or dropped inside a container. The probe's Hall Effect sensor measures the distance between the probe tip and target ball. This method is time consuming, only measures overall wall thickness and cannot measure multi-layer structures, and may not be integrated into manufacturing lines.

As an example, multi-layer thickness measurement for opaque and transparent plastic preforms in the plastic industry may be used for quality control and inspection of manufactured plastic bottles and preforms. A problem in the plastic industry is the measurement of the barrier layer in multi-layer plastic bottle and preforms. The barrier layer may prevent egress and ingress of gas such as carbon dioxide and oxygen, block light, and keep contents fresh. Currently multi-layer preform thickness measurement is done by cutting the sample, pealing the layers and weighting them, which is a time consuming and destructive process. To date, there is no effective technology that satisfactorily addresses the opaque and transparent multilayer thickness measurement of plastic preforms and bottles in plastic industry. The plastic industry has a need to use non-contact, non-destructive, and non-invasive method to determine existence of the barrier and thickness of each layer in multi-layer plastic bottle or preform.

SUMMARY

According to one broad aspect, there is a method for measuring thicknesses of layers of a multi-layered structure. The method includes generating a terahertz wave pulse, transmitting the terahertz wave pulse to the multi-layered structure having multiple layers of materials, receiving reflected terahertz wave pulses reflected by boundaries between the multiple layers as the terahertz wave pulse penetrates the multi-layered structure, and processing the reflected terahertz wave pulses to: (i) determine whether the reflected terahertz wave pulses have a pulse width overlap; (ii) in response to determining that a pulse width overlap exists, generate modified reflected terahertz wave pulses; (iii) measure time delays associated with each of the reflected terahertz pulses and (ii) determine a thickness of each of the multiple layers of materials based upon the time delays and a material refractive index of each of the materials.

In at least one embodiment, processing the reflected terahertz wave pulses to generate modified reflected terahertz wave pulses can involve: determining an amplitude and time of a pulse of the reflected terahertz wave pulses indicative of a barrier reflection; determining an amplitude and time of a first pulse of the reflected terahertz wave pulses; and determining a ratio of the amplitude of the first pulse to the amplitude of the pulse indicative of the barrier reflection. In response to determining that the ratio of the amplitude of the first pulse to the amplitude of the pulse indicative of the barrier reflection is less than a predefined threshold, the pulse indicative of the barrier reflection can be time shifted by a predetermined amount and a remaining portion of the reflected terahertz wave pulses can be retained to provide the modified reflected terahertz wave pulses. In response to determining that the ratio of the amplitude of the first pulse to the barrier reflection is greater than the predefined threshold, the reflected terahertz wave pulses can be provided as the modified reflected terahertz wave pulses.

In at least one embodiment, time shifting the pulse indicative of the barrier reflection by the predetermined amount can involve determining the width of the pulse indicative of the barrier reflection.

In at least one embodiment, the predetermined amount can be is based on the multiple layers of materials of the multi-layer structure.

In at least one embodiment, the predefined threshold can be based on at least one of signal attenuation and type of materials of the multiple layers in the multi-layer structure.

In at least one embodiment, the multi-layer structure can include a multi-layer plastic structure having a barrier layer between a first layer and a second layer. The barrier layer can have a thickness of less than about 120 micrometers.

In at least one embodiment, determining an amplitude and time of a pulse of the reflected terahertz wave pulses indicative of a barrier reflection can involve determining the amplitude of the pulse the reflected terahertz wave pulses at an intermediate largest slope. The intermediate largest slope can be between a first largest slope and a last largest slope.

In at least one embodiment, determining an amplitude and time of a first pulse of the reflected terahertz wave pulses can involve determining the amplitude of the pulse the reflected terahertz wave pulses at a first largest slope.

In at least one embodiment, processing the reflected terahertz wave pulses can further involve digital averaging the reflected terahertz wave pulses to eliminate noise.

In at least one embodiment, digital averaging of the reflected terahertz wave pulses can be determined based on $$\frac{x((m*n-n)+1)}{n} + \frac{x((m*n-n)+2)}{n} + \cdots + \frac{x(m*n)}{n},$$

wherein x is value of a digital sample of the reflected terahertz wave pulses, n is a total number of digital samples of the reflected terahertz wave pulses, and m is an integer value.

According to another broad aspect, there is a system for measuring thicknesses of layers of a multi-layered structure. The system includes a driver for producing a terahertz wave pulse; a terahertz photoconductive transmitter for transmitting the terahertz wave pulse to the structure having multiple layers of materials; a terahertz photoconductive receiver for receiving reflected terahertz wave pulses reflected by boundaries between the multiple layers as the terahertz wave pulse penetrates the multi-layered structure and by a double-pass terahertz beam splitter; the double-pass terahertz beam splitter; and a processor for processing the reflected terahertz wave pulses. The double-pass terahertz beam splitter has a first surface proximal to the terahertz photoconductive transmitter and a second surface proximal to the terahertz photoconductive receiver, the terahertz pulse wave transmitted from the terahertz photoconductive transmitter being incident on the first surface, the reflected terahertz wave pulses from the multi-layered structure being incident on the second surface and reflected to the terahertz photoconductive receiver. The processor is configured to (i) measure time delays associated with each of the reflected terahertz pulses and (ii) determine a thickness of each of the multiple layers of materials based upon the time delays and a material refractive index of each of the materials.

In at least one embodiment, the double-pass terahertz beam splitter can include a single-sided anti-reflection coating on the first surface.

In at least one embodiment, the single-sided anti-reflection coating can be compatible with terahertz light.

In at least one embodiment, the single-sided anti-reflection coating can include at least one of polyethylene and parylene.

In at least one embodiment, the system can further include absorbing material proximal to the first surface for absorbing stray beam generated from the terahertz pulse wave from the terahertz photoconductive transmitter being incident on double-pass terahertz beam splitter.

In at least one embodiment, the absorbing material can include at least one of rubber and a metal particle filled rubber product.

In at least one embodiment, can further include absorbing material around the path of the first and second wave beams to attenuate noise and unwanted reflection.

In at least one embodiment, the absorbing material can include at least one of rubber and a metal particle filled rubber product.

In at least one embodiment, the multi-layer structure can include a multi-layer plastic structure, the multi-layer plastic structure comprising a barrier layer between a first layer and a second layer, the barrier layer comprising a thickness less than about 120 micrometers.

According to one aspect, there is provided a method for thickness measurement of multi-layer structures such as opaque and transparent plastic bottles, preforms, paper, web and sheet, rubber and plastic hoses and tubes using terahertz waves. A terahertz wave pulse is generated by terahertz sources and interacts with the materials and multilayer structure under test and the transmitted and/or reflected terahertz waves through/off the materials are detected by terahertz detectors. The echoes of the incident Terahertz (THz) pulse are reflected from the walls and layers of the multilayer structure such as a preform or bottle under test.

Terahertz pulses penetrate materials such as, for example, plastics, rubber, ceramic and paper, and are reflected at each material/air or multi-layer boundary. The THz pulses from the transmitter go to the multi-layer structure or sample under test and the reflected pulses from the sample are coupled into the THz detector. The reflected THz pulses from the multi-layer sample have their time delay measured that corresponds to the thickness of the layers of the sample under test such as plastic preform and plastic bottle. The peak amplitudes of the reflected pulses also decrease as they experience absorption loss and Fresnel reflections.

The reflected terahertz pulses have their time delays related to the material refractive index in the terahertz range. The Terahertz pulse reflected from the walls, and layers of the plastic preform bottles have a specific time delay that allows a user to calculate the thickness of each wall and of an opaque and/or transparent material structure such as plastic preform and bottle. For preforms, bottles, hoses and tubes, the terahertz measurement method includes signal processing to extract the reflections from the inner layers of the multilayer material structure and determine the peak and minimum position in time delay of each echo pulse.

In some cases, the reflected and/or transmitted terahertz pulses are analyzed and signal processed to extract the weak reflections from the noise and features of the terahertz signal waveform that distorts the pulse shape of the raw waveform before signal processing. The terahertz measurement method involves signal processing for multilayer structure by recording the terahertz signal waveform for the case of a monolayer structure such as preform, where the sample is a multi-layer wall brought to the focus of the terahertz beam, and the recorded reference monolayer terahertz waveform is removed from the sample multi-layer terahertz waveform measurement in order to remove the effects of the common deterministic feature which is result of the measurement condition. When the reference terahertz waveform is subtracted from the multi-layer sample terahertz waveform, the weak reflections from the inner layers becomes more predominant.

The problem addressed here is the measurement of the wall thickness and multi-layer thickness measurement of opaque and transparent plastic preforms, bottles, paper, plastic and rubber hoses, foam, web and sheet using a non-contact, non-invasive, and non-destructive measurement method.

As an example, multi-layer thickness measurement for opaque and transparent plastic preforms in the plastic industry for quality control and inspection of manufactured plastic bottles and preforms. The terahertz measurement system can pass through opaque and transparent plastics and preforms and measures the multi-layer thickness of each layer.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 1A is a schematic diagram of an exemplary thickness measurement system, in accordance with an embodiment;

FIG. 1B is a terahertz waveform, in accordance with an exemplary embodiment;

FIG. 13 is a Terahertz Pulse Measurement Trace for a multilayer plastic structure.

DETAILED DESCRIPTION

Figure 2:
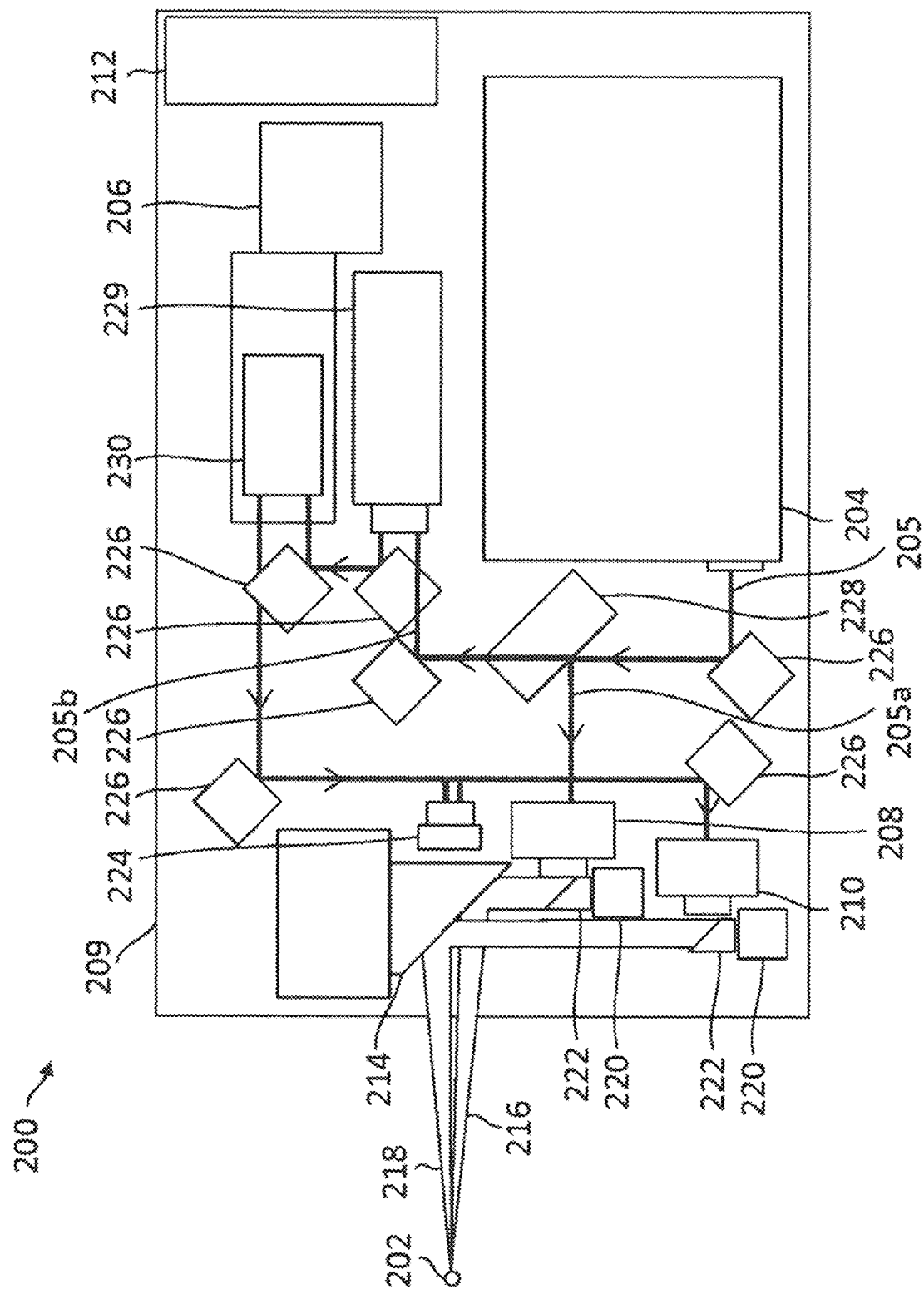
FIG. 2 is a schematic diagram of an exemplary terahertz sensor system operating in reflection mode, in accordance with an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Many materials including polymers, plastics, organic and inorganic materials, rubber, ceramics, papers and cupboards, glasses, etc. are transparent or semi-transparent to terahertz waves. There is a need to measure multi-layer thickness of structures such as preforms, bottle and web and sheet that are made with these materials. A reflection or transmission-mode terahertz time-domain system, that uses a pair of terahertz transmitter and receiver, is used to measure reflected echoes from the layers of a multi-layer structure. Many of these multi-layer materials are opaque to visible light, and near-infrared light making conventional thickness measurement for advanced manufacturing impossible. This makes terahertz waves an ideal tool to do single and multi-layer thickness measurement based on their properties at terahertz frequencies.

Referring now to FIG. 1A, illustrated therein is a sample measurement system 100, in accordance with an embodiment. The sample measurement system 100 includes a terahertz sensor system 102 for conducting thickness measurement on a sample under test 104. Terahertz are electromagnetic waves within the ITU-designated band of frequencies from 0.3 to 3 terahertz (THz; 1 THz=1012 Hz). Wavelengths of radiation in the terahertz band correspondingly range from 1 mm to 0.1 mm (or 100 µm).

The sample 104 is multi-layered material having a first layer 106 and a second layer 108. The sample 104 includes a barrier layer 110 between the first layer 106 and the second layer 108. The sample 104 may be a preform, hose, tubes, or bottles. The sample 104 may be made of materials such as plastics, rubber, ceramic, papers etc. For example, the first and second layers 106 may be PET (polyethylene terephthalate) or HDPE (high-density polyethylene) and the barrier layer 110 may be EVOH (ethylene vinyl alcohol) or nylon.

The terahertz sensor system 102 produces a terahertz incident pulse 112. The terahertz wave is a wide band terahertz pulse 112 generated by a terahertz wide band source such as a terahertz photoconductive antenna.

The incident pulse 112 is reflected at the material-air and multi-layer boundaries to create reflected pulses 114, 116, 118, 120. The reflected pulses 114, 116, 118, 120 are received into the terahertz sensor system 102.

FIG. 1B illustrates a measured trace 150, of the reflected pulses 114, 116, 118, 120. The reflected trace 150 includes time delays 152, 154, 156 of the reflected THz pulses 114, 116, 118, 120. The time delays 152, 154, 156 are compared to a thickness reference index to determine the thickness of the first layer 106, the second layer 108, and the boundary layer 110 of the sample 104. The reflected trace 150 includes peak amplitudes which may also decrease as the reflected pulses 114, 116, 118, 120 experience absorption loss and Fresnel reflections.

The system 100 includes a processing device 122 for processing the signals, 114, 116, 116, 120. The device 122 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network. Input device may include any device for entering information into device 122. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 122 may include multiple of any one or more of processors, applications, software modules, second storage devices, network connections, input devices, output devices, and display devices.

Although device 122 is described with various components, one skilled in the art will appreciate that the device 122 may in some cases contain fewer, additional or different components. In addition, although aspects of an implementation of the device 122 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the device 122 and/or processor to perform thickness measurement.

In particular, the processer 122 is configured to process the reflected terahertz wave pulses. The processor 122 is configured to measure the time delays associated with each of the reflected terahertz pulses. The processor 122 is configured to determine a thickness of each of the multiple layers of materials based upon the time delay and a material refractive index of each of the materials.

Referring now to FIG. 2, illustrated therein is a terahertz sensor system 200 for measuring thickness of a multi-layered structure sample 202, in accordance with an embodiment. The terahertz system 200 includes a driver 204 for producing a pulsed wave light beam 205. The driver 204 drives the time-domain system and produces a pulsed laser beam with a pulse width generally in the femtosecond range.

The system 200 includes an optical beam splitter 228 for splitting the terahertz pulsed laser beam 205. The optical beam splitter 228 may be a 1" optical beam splitter. The pulsed wave laser beam 205 is split by the beam splitter 228 to form split pulsed wave laser beams 205a and 205b.

The system 200 includes a terahertz transmitter 208 for receiving the pulsed light beam 205a and for generating and transmitting terahertz radiation 216. The system 200 includes a terahertz detector 210 for receiving the pulsed light beam 205b and the sample-influenced terahertz radiation 218 reflected from the multi-layered structure 202 and generating a time varying current correlatable therewith.

Terahertz transmitter 208 may include a first photoconductive antenna having electrodes, and a voltage source for providing a voltage bias to the electrodes, wherein the first photoconductive antenna receives beam 205a output from driver 204 to modulate its conductance in order to generating terahertz radiation 216. The first terahertz photoconductive antenna of the terahertz transmitter 208 transmits the terahertz pulsed beam 216.

When the beam 205a impinges onto the first photoconductive antenna, the conductivity of the photoconductive antenna will increase, thus generating a current that results in terahertz radiation 216. The frequency of the radiation 216 depends on the mode and configuration of the beam 205a provided by the driver 204.

Terahertz detector 210 may include a second photoconductive antenna configured to receive beam 205b output from the driver 204, which modulates its conductance in order to generate time varying current. A sample-influenced time varying voltage is induced in the second photoconductive antenna upon receiving terahertz radiation 218. The received terahertz radiation 218 will be sample-influenced and possesses additional information relating to the sample 202. The sample-influenced time varying current is collected from the electrodes and correlated to the sample-influenced induced time varying voltage and the modulated conductance of the second photoconductive antenna.

The free-air terahertz photoconductive antennas transmit and receive terahertz waves reflected from the samples under test 202. The terahertz transmitter 208 and the terahertz receiver 201 may be fixed to a gauge chassis 209 to provide increased stability.

The terahertz radiation 216 is used to non-invasively probe the sample 202, which results in generating the sample-influenced terahertz radiation 218, which is received by the second photoconductive antenna. The beam 205b is used to excite the photoconductive antenna and modulate its conductance. Upon receiving the sample-influenced terahertz radiation 218, a time varying voltage v(t) is induced across the electrodes and a corresponding time varying current i(t) is measured. A time varying electric field E(t) may be computed from the measured i(t) and a Fourier transform may be done to derive the frequency response F(s) of E(t). The system output for further processing may be in the form of the above mentioned frequency response F(s), time varying electric field E(t), or the time varying current i(t).

The pulsed beam 205*a* is used to excite the first photoconductive antenna for generating pulsed terahertz radiation 216. The pulsed beam 205*b* is used to excite the second photoconductive antenna for detecting terahertz radiation. The operator may select the modes of terahertz generation and detection based on sampling requirements such as resolution and frequency range.

The wave pulse 205 that contains a range of frequencies (according to the Fourier synthesis of a pulse waveform) is used to modulate the conductance of the photoconductive antenna at a range of frequencies. In turn, the generated terahertz radiation 216 will contain a wide spectrum of terahertz frequencies. The actual range of the frequencies may be controlled by varying the pulse width of the pulsed wave laser 205.

The system 200 includes a linear stage or shaker 206 for providing an optical delay line for the pulsed beam 205*b*. The linear stage or a shaker 206 is used as an optical delay line for the pump-probe beam terahertz measurement setup. The high speed optical delay may be mounted on the long distance optical delay. The beam 205*b* is fed to a translational stage 229 controlled by a computer (e.g., 122 of FIG. 1). A retro-reflector mirror 230 is used to change the optical path delay in the probe beam path for coherent detection of incident THz wave by the photoconductive antenna. The retro-reflector 230 may be a 0.75" retro-reflector.

Changing the optical path delay in the probe beam path can be done by increasing the probe beam optical path by moving the retro-reflector mirror 230 further away from the direction of the incoming probe beam. By using the motorized translational stage 229 to introduce delay in the probe beam path, an operator can bring the probe beam to the receiver photoconductive antenna with different time delays with respect to the incident THz wave, which makes it possible to record the samples of the incident THz wave at the lock-in at sub-picosecond time intervals and reconstruct the THz electric field.

The system includes a low-noise amplifier 212 for amplifying and converting the current from the terahertz photoconductive antenna to an amplified voltage signal that is recorded to form the terahertz waveform. The low-noise amplifier 212 amplifies and converts the current from the terahertz antenna 208 to an amplified voltage signal that is recorded to form a terahertz waveform.

The system includes an exit parabolic mirror 214 for separating the transmitted 216 and received 218 terahertz pulsed beam. This allows for 100% of the signal to be directed on target, instead of losing 50% for every pass through a silicon beam splitter. The parabolic mirror 214 may be large to allow more angular variation in sample position.

The system 200 includes an adjustment stages 220 for adjusting the location of the terahertz photoconductive antenna 208 and a focusing lens 222 for focusing the terahertz pulsed beam. The adjustment stages 200 may be XY adjustment stages. The focusing lens 222 may be a 0.5" focusing lens.

The system may further include a laser diode 224 for indicating the position of terahertz focus of the multi-layered structure 202.

The system 200 includes a plurality of dielectric mirrors 226 for redirecting the laser pulsed beam. The dielectric mirrors 226 may be 0.5" dielectric mirrors.

The system 200 may be connected to a computer (e.g., the processor 122) to process terahertz signals and perform certain aspects of the methods described herein.

Figure 3:
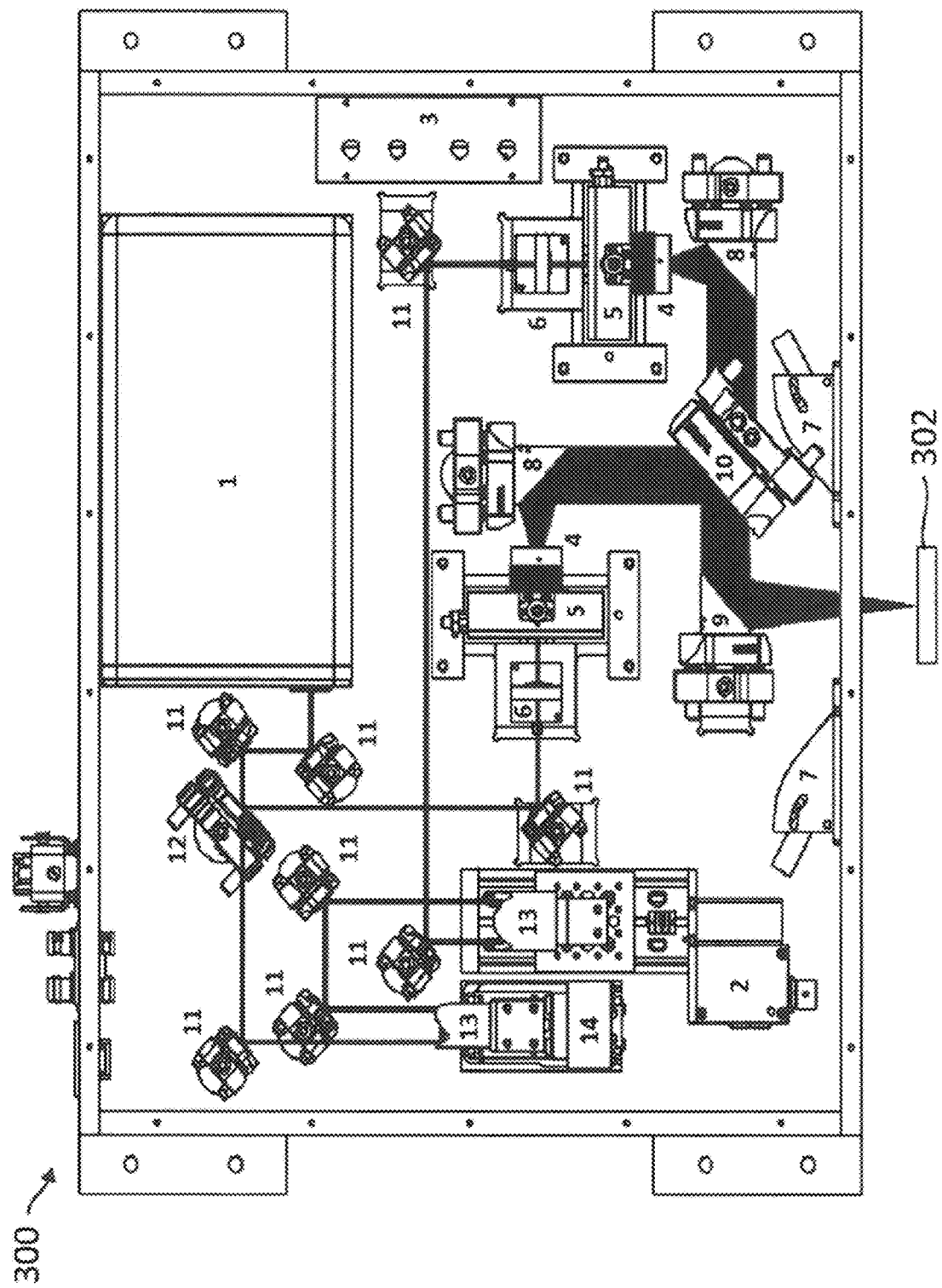
FIG. 3 is a schematic diagram of an exemplary terahertz sensor system operating in reflection mode, in accordance with a further embodiment.

Referring now to FIG. 3, illustrated therein is schematic diagram of a terahertz sensor system 300 made in accordance with an exemplary embodiment. The terahertz sensor system includes a first component 1 that drives the time-domain system and a femtosecond pulsed Laser. The terahertz system also includes a linear stage or a shaker 2, a low-noise amplifier 3 (LNA), and terahertz antennas and receivers 4. The linear stage or a shaker 2 is used as an optical delay line for the pump-probe beam terahertz measurement setup. The low-noise amplifier 3 amplifies and converts the current from the terahertz antenna 4 to an amplified voltage signal that is recorded to form the terahertz waveform in FIG. 4. The free-air terahertz photoconductive antenna transmitters and receivers 4 transmit and receive terahertz waves reflected from the samples under test 302.

The terahertz sensor system also includes other optical components used in the system including XY adjustment stages 5, focusing lens 6 (e.g., of 0.5"), laser diodes as indicator of position of terahertz focus of the object 7, FL off axis mirrors 8 (e.g., of 4"), FL off axis mirror 9 (e.g., of 6"), THz beam splitter 10 (e.g., of 2"), dielectric Mirrors 11 (e.g., of 0.5"), optical beam splitter 12 (e.g., of 1"), and retro-reflector 13 (e.g., of 0.75").

Figure 4:
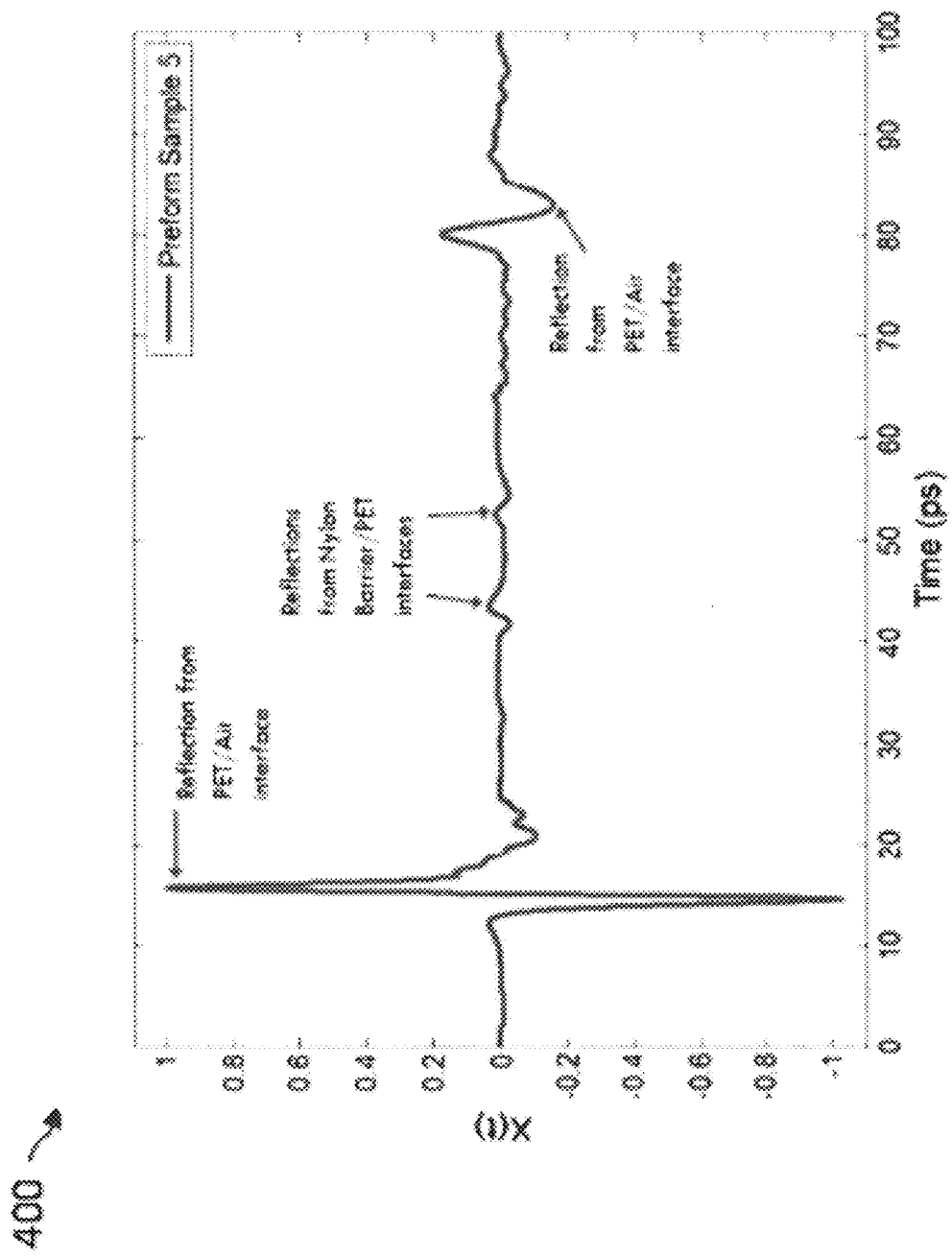
FIG. 4 is a Terahertz Pulse Measurement Trace after signal processing to extract the barrier layer for a PET Multi-layer Preform Sample or PET/Nylon/PET Preform.

Referring now to FIG. 4 illustrated therein is a schematic diagram 400 of a terahertz reflection-mode measurement for a transparent PET preform that shows the reflection from the first interface between air and PET (outside interface), reflection from PET and Barrier interface, and then reflection from the last interface between air and PET (inside surface). From the difference between the time delays of these three reflected pulses, and known refractive index in the terahertz range, the system calculates the thickness of the layers.

The terahertz waveform is shown after signal processing to remove the effect of the reference mono-layer structure such as preform terahertz waveform from the multilayer structure terahertz waveform trace. The echo pulses have positive polarity when going from less dense to more dense medium such as from air to PET and have negative polarity when going from dense to less dense medium. The time delay in picoseconds is measured and the peaks of the echo pulses going from the less dense to dense layer and minimum or negative peak of echo pulses for pulses going from more dense to less dense material layer is also measured.

For the mono-layers, the overall thickness can be found based on the reflection of the Terahertz pulses and using the formula that the thickness in millimeters is related to the time delay $\Delta t$ between peaks of the pulse in picoseconds, the refractive index of the material PET, n, the speed of light c, which is 0.3 mm/ps and factor of 2 for the distance traveled by the probe beam in the THz –time domain setup is twice because of the retro-reflector delay line, gives the relation: $d=(\Delta t \times c)/2n$.

For the case of multi-layers the refractive index of the material of the barrier is used in the thickness calculation of the barrier layer. The cases of multi-layer preforms, bottles, and hoses and tubes, the signal processing method involves recording the reference single-layer structure terahertz waveform and removing it from the multi-layer structure terahertz waveform in order to extract the reflections of the inner layers which are weak because the contrast between the inner barrier layer materials is close to the outside layer material.

Figure 5A:
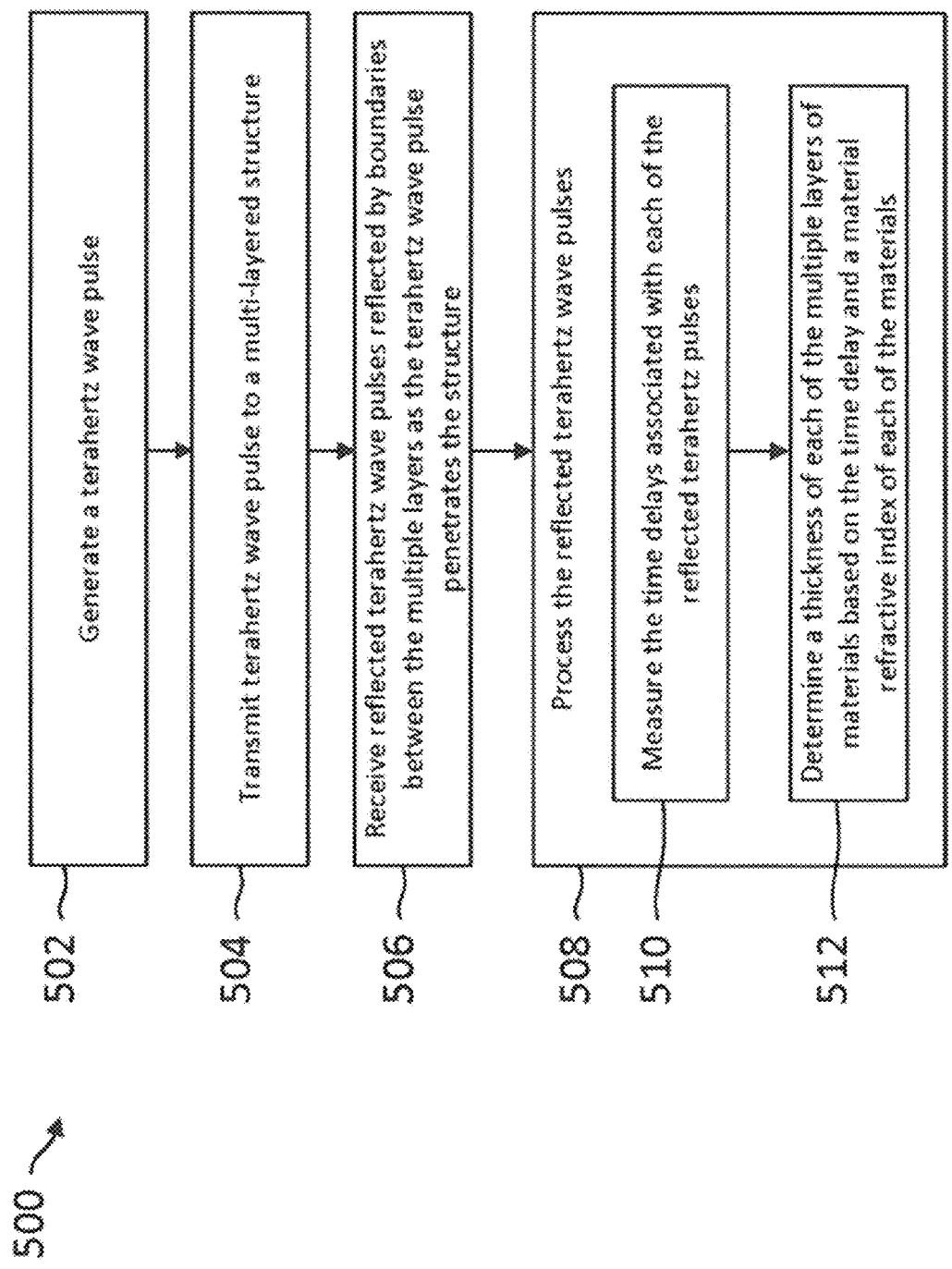
FIG. 5A is a flow chart of a method for measuring thicknesses of layers of a multi-layered structure, in accordance with an embodiment.

Referring now to FIG. 5A, illustrated therein is a method 500 for measuring thicknesses of layers of a multi-layered structure. At 502, a terahertz wave pulse is generated. At 504, the terahertz wave pulse is transmitted to a multi-layered structure having multiple layers of materials. At 506, reflected terahertz wave pulses are received. The reflected terahertz wave pulses are reflected by boundaries between the multiple layers as the terahertz wave pulse penetrates the structure. At 508, the reflected terahertz wave pulses are received. At 510, the time delays associated with each of the reflected terahertz pulses are measured. At 512, a thickness of each of the multiple layers of materials is determined based upon the time delay and a material refractive index of each of the materials. The thickness of the barrier layer may also be determined. The location of the barrier layer and the location of each of the multiple layers may also be determined.

Figure 5B:
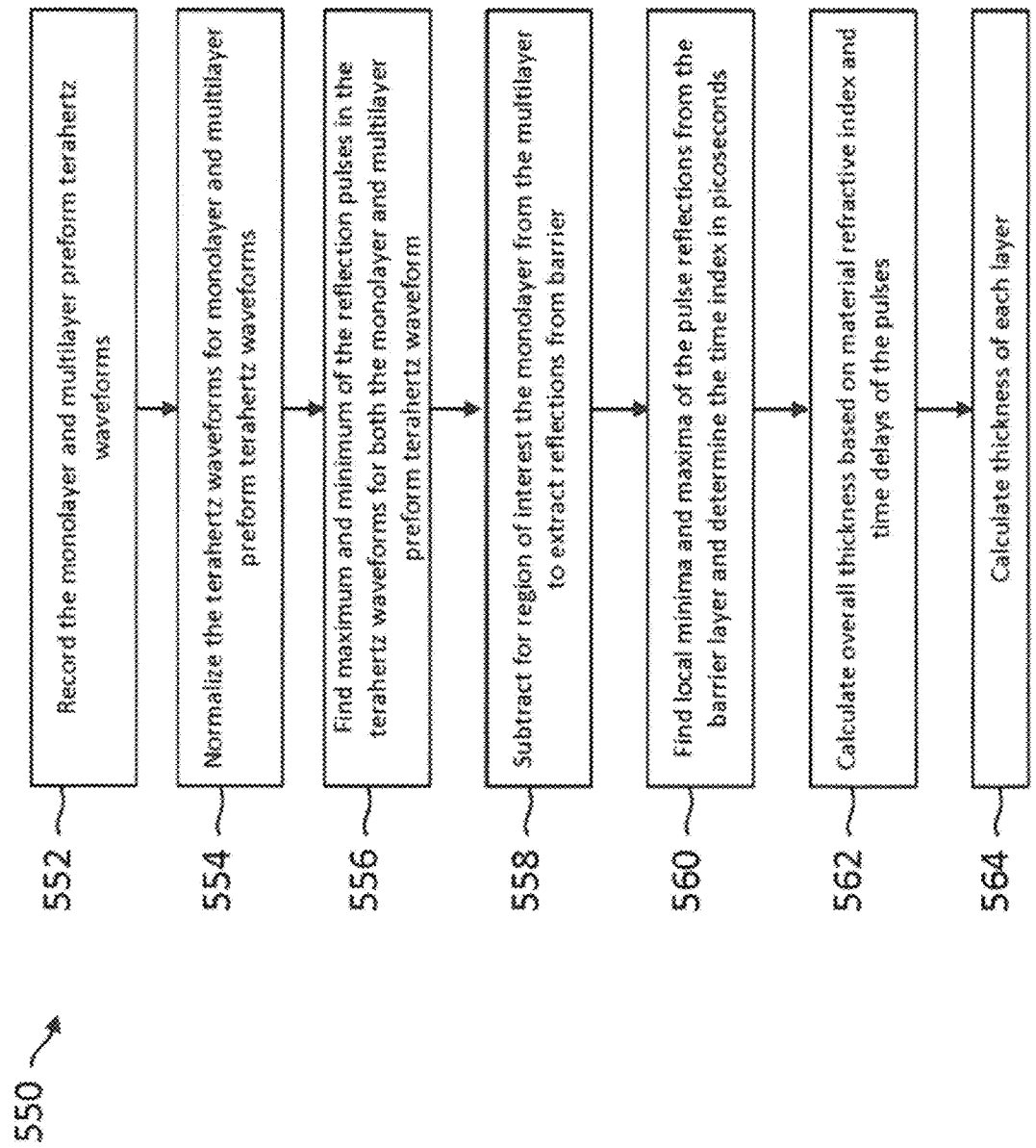
FIG. 5B is a schematic diagram of a method for determining overall thickness and barrier thickness in multilayer transparent and opaque preforms using a terahertz sensor system operating in reflection mode.

Referring now to FIG. 5B illustrated therein is schematic diagram of a method 550 for determining overall thickness and barrier thickness and location in multilayer transparent and opaque preforms using the subject terahertz sensor system operating in reflection mode. The monolayer preform is brought to the focus of the terahertz beam that is emitted from the terahertz gauge measurement device and a reference waveform recorded at 552 for signal processing and extraction of the terahertz pulses from the barrier reflections. At 554, the terahertz waveforms are normalized for monolayer and multilayer preform terahertz waveforms.

Figure 6:
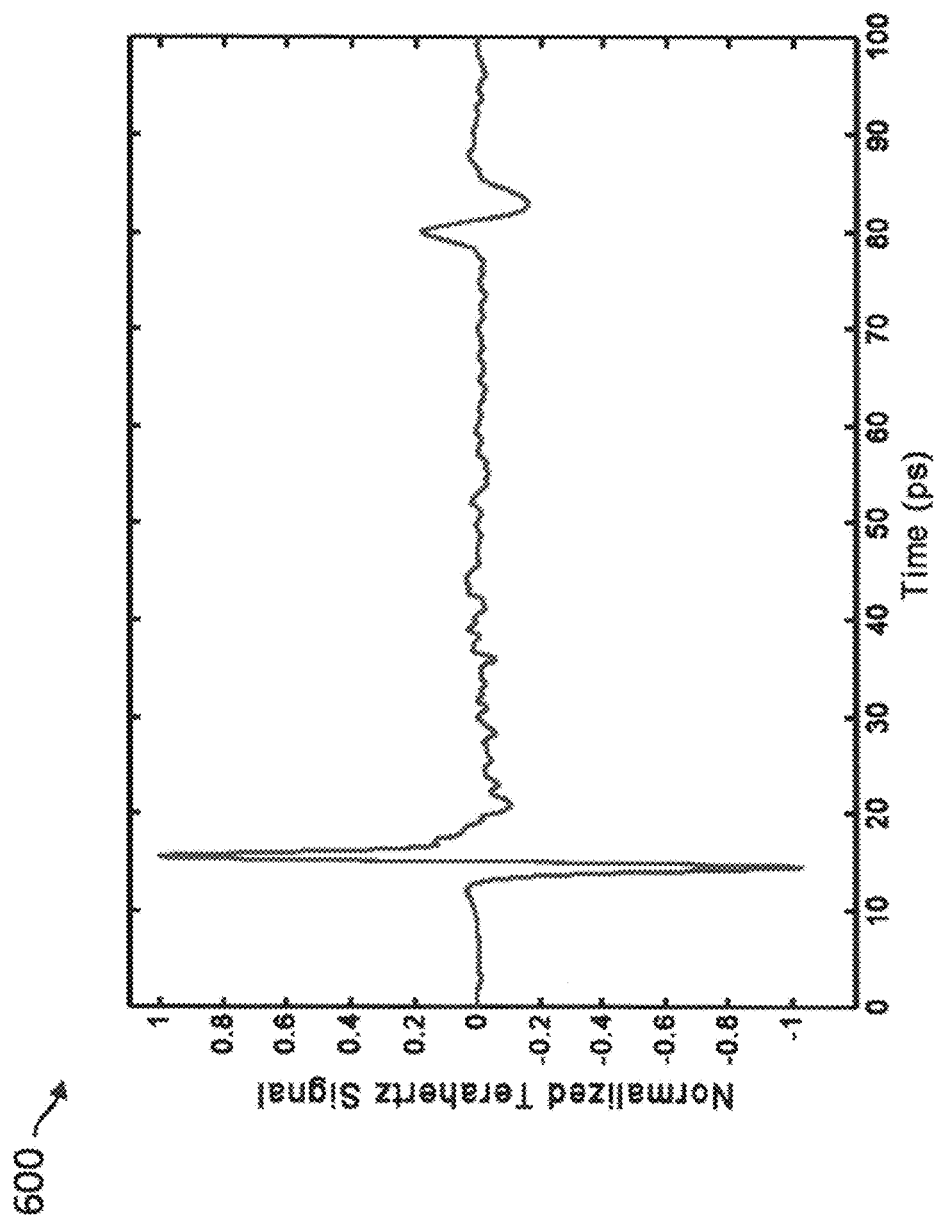
FIG. 6 is a Terahertz Pulse Measurement Trace before signal processing to extract the barrier layer for a PET Multi-layer Preform Sample or PET/Nylon/PET Preform.

The multilayer preform is placed at the focus of the terahertz beam and the reflections from the outer, barrier and inner layers for the preform recorded in a terahertz waveform similar to shown in FIG. 6. Then the Monolayer terahertz waveform is subtracted at 558 from the Multilayer terahertz waveform in order to make the reflections from the barrier more prominent. The resulting waveform after processing is shown in FIG. 4.

At 556, the first local maxima of the pulse reflection waveform from the barrier for the case of the refractive index of barrier layer such as Nylon being greater than the first layer such as PET, and the second local minima from the reflection going from the barrier to the inner layer gives the time delay at 560 in picoseconds between the pulses. From the echo of the pulses after signal processing and using the refractive index, the overall thickness and thickness of each layer including the barrier is calculated at 562. For the case of the barrier refractive index being lower than the inner and outer layers in the terahertz range, the first local minima and second local maxima from the barrier reflections is used to determine the barrier thickness and location and thickness and location of each layer at 564.

Referring now to FIG. 6 illustrated therein is a Terahertz Pulse Measurement Trace 600 before signal processing to extract the barrier layer for a PET Multi-layer Preform Sample or PET/Nylon/PET Preform. The measured terahertz signal shows that the barrier reflections are not clear and need signal processing and use of proposed method to extract the barrier reflections with result shown in FIG. 4. The present method to extract the barrier reflections and thickness can be used for both transparent and opaque preforms.

Figure 7:
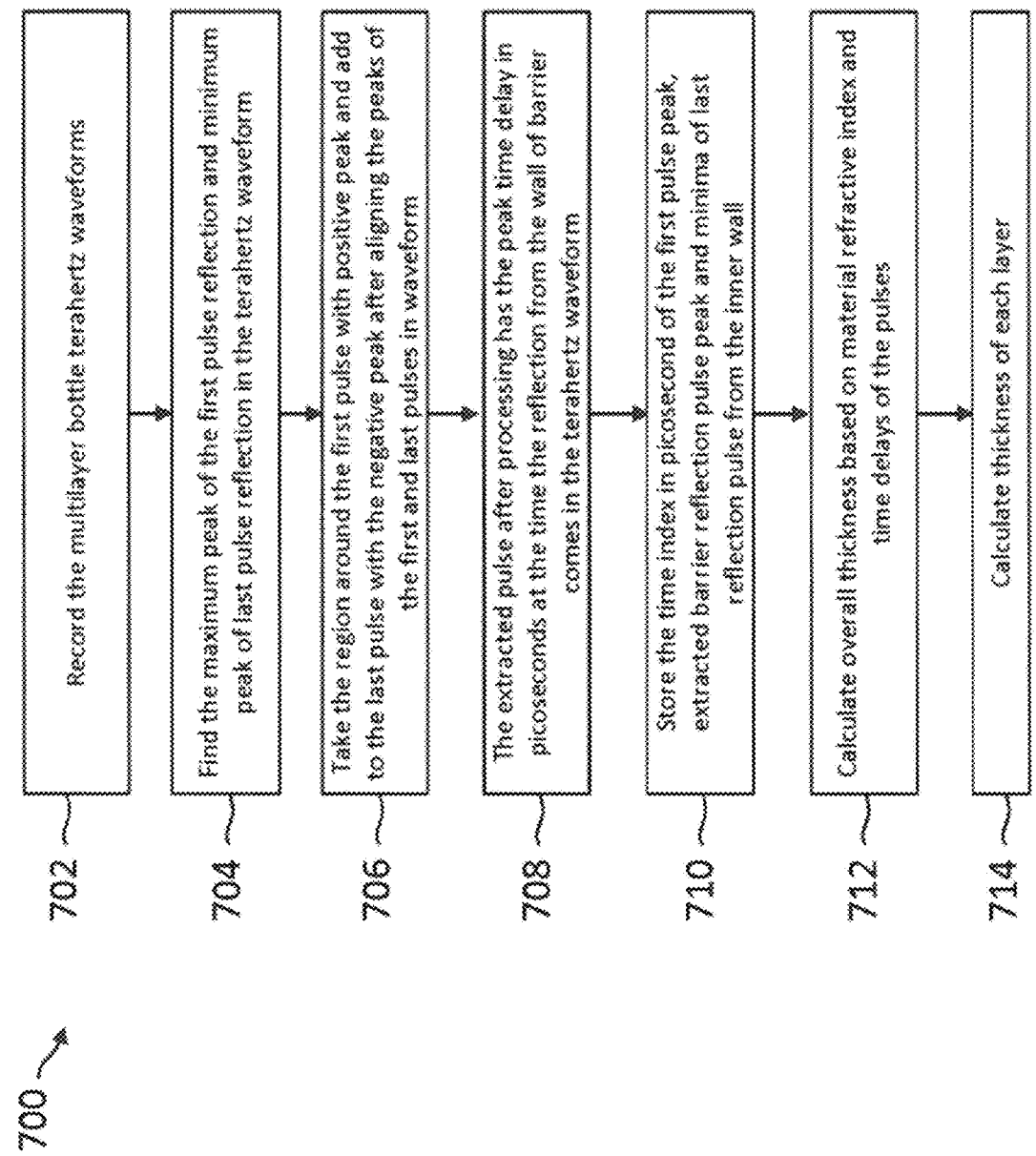
FIG. 7 is a schematic diagram of a method for determining overall thickness and barrier thickness in multilayer transparent and opaque bottles using a terahertz sensor system operating in reflection mode.

Referring now to FIG. 7 illustrated therein is schematic diagram of a method 700 to determine overall thickness and barrier thickness in multilayer transparent and opaque bottles using terahertz sensor system made in accordance with an exemplary embodiment. For the Multilayer bottles made with materials that are not as dispersive and are lossless in terahertz range such as Polyethylene (HDPE, PP, etc.) the multilayer bottle terahertz waveforms are measured and recorded 702 with the terahertz pulses reflected from the layers in the bottle.

When the barriers are very thin, the reflected pulses with sub-picosecond pulse width overlap and hence need signal processing to extract the reflections from the barriers.

The barrier thickness extraction process for bottles involves finding at 704 maximum peak of the first pulse reflection and minimum peak of last pulse reflection in the terahertz waveform, then the region around the first pulse with positive peak is taken at 706 and add to the last pulse with the negative peak after aligning the peaks of the first and last pulses in waveform. At 708, the extracted pulse after processing has the peak time delay in picoseconds at the time the reflection from the wall of barrier comes in the terahertz waveform. Then the time index in picosecond of the first pulse peak, extracted barrier reflection pulse peak and minima of last reflection pulse from the inner wall is stored at 710 and overall thickness is calculated at 712 based on Material Refractive Index and time delays of the pulses. The thickness of each layer is calculated at 714.

Figure 8:
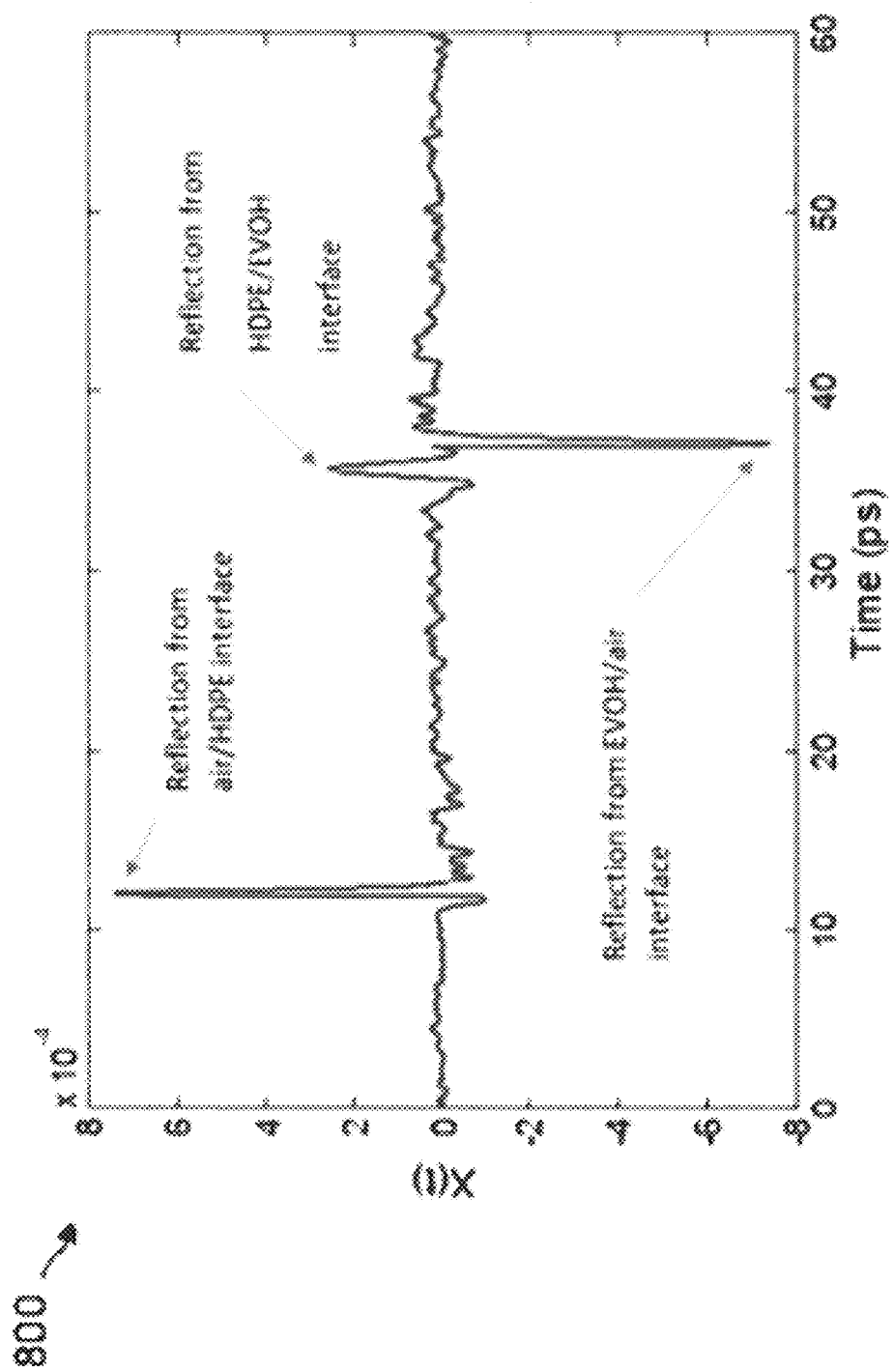
FIG. 8 is a Terahertz Pulse Measurement Trace after signal processing to extract the barrier layer for a HDPE Multi-layer Bottle with Ethylene vinyl alcohol (EVOH) layer. The first pulse reflection from the outer layer is used to extract the reflection from EVOH layer as the thickness is thin and the reflected pulse from the barrier and outer layer of the wall overlap and so the reflection from the EVOH layer should be extracted from the superposition of the two pulses in the terahertz waveform.

Referring now to FIG. 8 illustrated therein are measurement results 800 collected from a terahertz sensor thickness measurement system after signal processing to extract the barrier layer for a HDPE multi-layer bottle with EVOH layer is accordance with an exemplary embodiment. The terahertz waveform after extracting the barrier reflections and other cases where the barrier reflections can be obtained from the terahertz waveform measurement can be used to find the barrier thickness and also where in the sample the barrier thickness is located with respect to inner and outer wall of the plastic bottle, preform, multilayer plastic medical device or rubber hose and tube.

Figure 9:
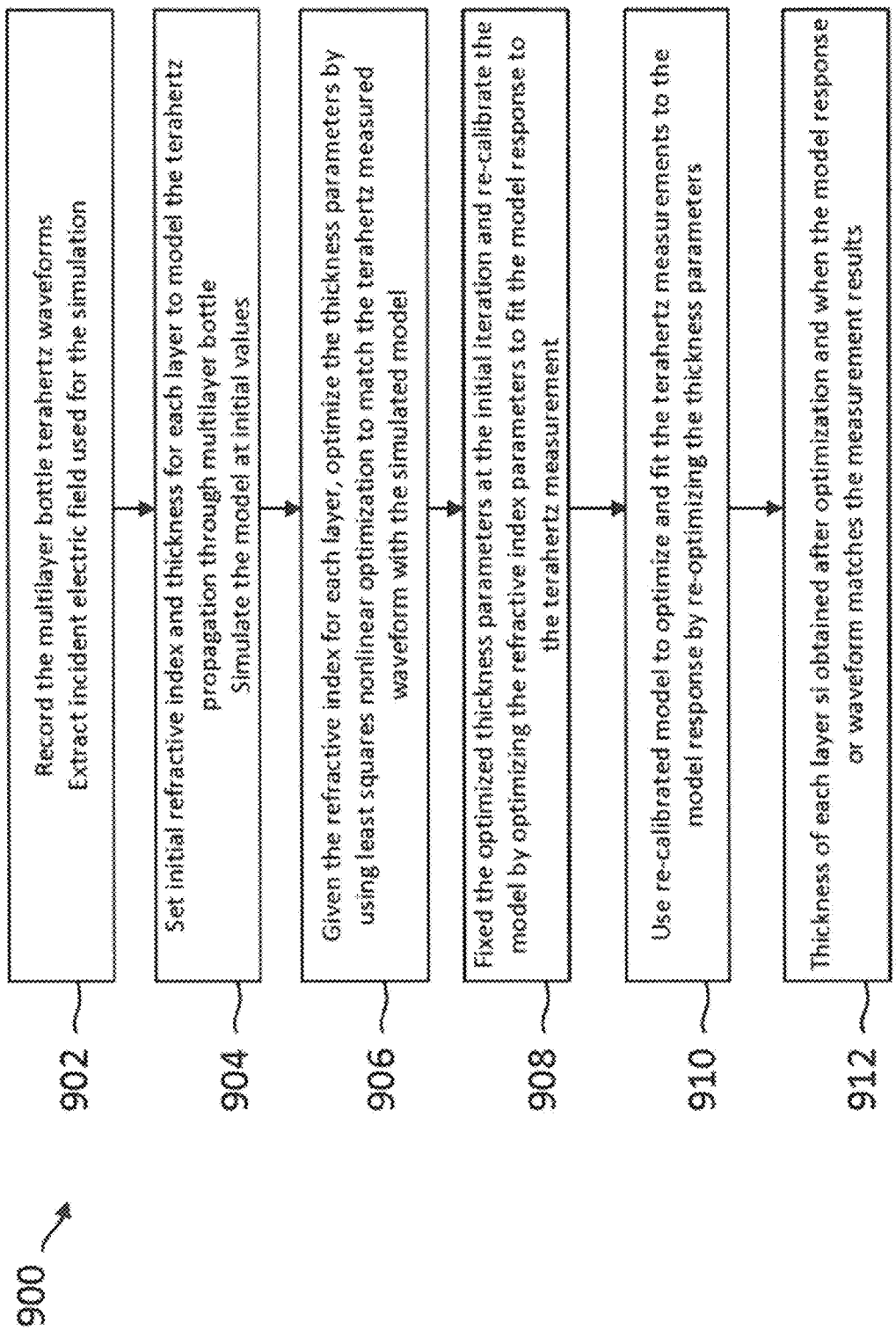
FIG. 9 is a schematic diagram of a method for determining thickness of individual layers and barrier thickness in multilayer transparent and opaque bottles using terahertz sensor system operating in reflection mode.

Referring now to FIG. 9 illustrated therein is a schematic diagram of a general simulation and optimization method 900 for determining thickness of individual layers and barrier thickness in multilayer transparent and opaque bottles using terahertz sensor system operating in reflection mode. The terahertz measurement system is first used to record, at 902, the multilayer bottle terahertz waveforms and the incident electric field terahertz pulse is extracted based on the refractive index of the first layer from the waveform and used for modelling and electromagnetic simulation using methods such as finite-different time domain (FDTD) simulation.

The initial refractive index and thickness for each layer to model the terahertz propagation through multilayer bottle is set at 904 and the model is simulated at initial values. At 906, given refractive index for each layer, next step is to optimize the thickness parameters by using least squares nonlinear optimization to match the terahertz measured waveform with the simulated model response. At 910, re-calibration optimization is performed by fixing the optimized thickness parameters at the initial iteration and re-calibrate the model by optimizing the refractive index parameters to fit the model response to the terahertz measurement. The re-calibrated model is used to optimize and fit the terahertz measurement to the model response by re-optimizing the model to find optimal thickness parameters. At 912, the thickness values are a final result when a criteria for matching the model with measurement is reached.

Figure 10:
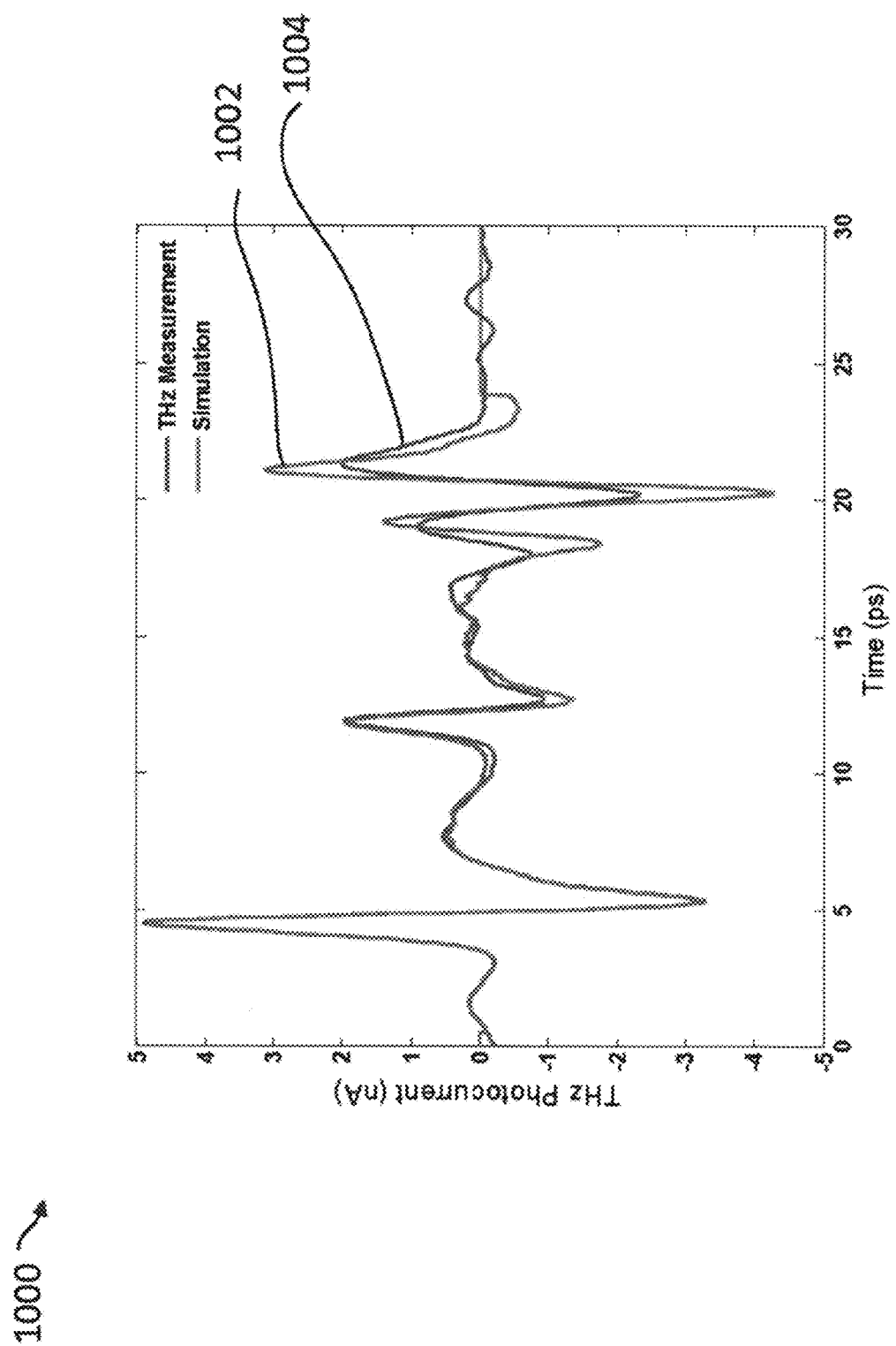
FIG. 10 is a Terahertz Pulse Measurement Trace and Simulated fit for a Multilayer Medical plastic bottle with reflection from Barrier layer, and inner layer of the wall.

Referring now to FIG. 10 illustrated therein are measurement results 1000 collected from a terahertz sensor thickness measurement system with the measurement result 1004 and waveform after optimization and simulation 1002 of the model that matches measurement waveform. The thickness of each layer is optimized given a fixed refractive index in order to match the terahertz waveform measurement.

Prior to processing the reflected terahertz wave pulses and/or determining a thickness of each of the multiple layers of materials, the processor 122 can implement various pre-processing techniques on the terahertz signal to eliminate noise prior to signal analysis. In at least one embodiment, the processor 122 can implement a digital averaging pre-processing technique that prevents memory overflow that can result from a large number of digital samples. In particular, a digital average of the terahertz signal can be obtained based on the number of samples. For example, for the first averaged signal point, a digital average can be determined from the digitally sampled terahertz signal based on Equation (1) as follows:

$$\frac{x(1)}{n} + \frac{x(2)}{n} + \cdots + \frac{x(n)}{n} \quad (1)$$

where x is the digitally sampled terahertz signal; and
n is the number of samples.

As can be seen from Equation (1), the number of samples, n is used as an averaging constant to obtain the averaged signal point.

For the second averaged signal point, the digital average can be determined based on Equation (2) as follows:

$$\frac{x(n+1)}{n} + \frac{x(n+2)}{n} + \cdots + \frac{x(n+n)}{n} \quad (2)$$

where x is the digitally sampled terahertz signal; and
n is the number of samples.

For the $m^{th}$ averaged signal point, the digital average can be determined based on Equation (3) as follows:

$$\frac{x((m*n-n)+1)}{n} + \frac{x((m*n-n)+2)}{n} + \cdots + \frac{x(m*n)}{n} \quad (3)$$

where: x is the digitally sampled terahertz signal;
n is the number of samples; and
m is an integer number 1, 2, 3, etc.

Figure 11:
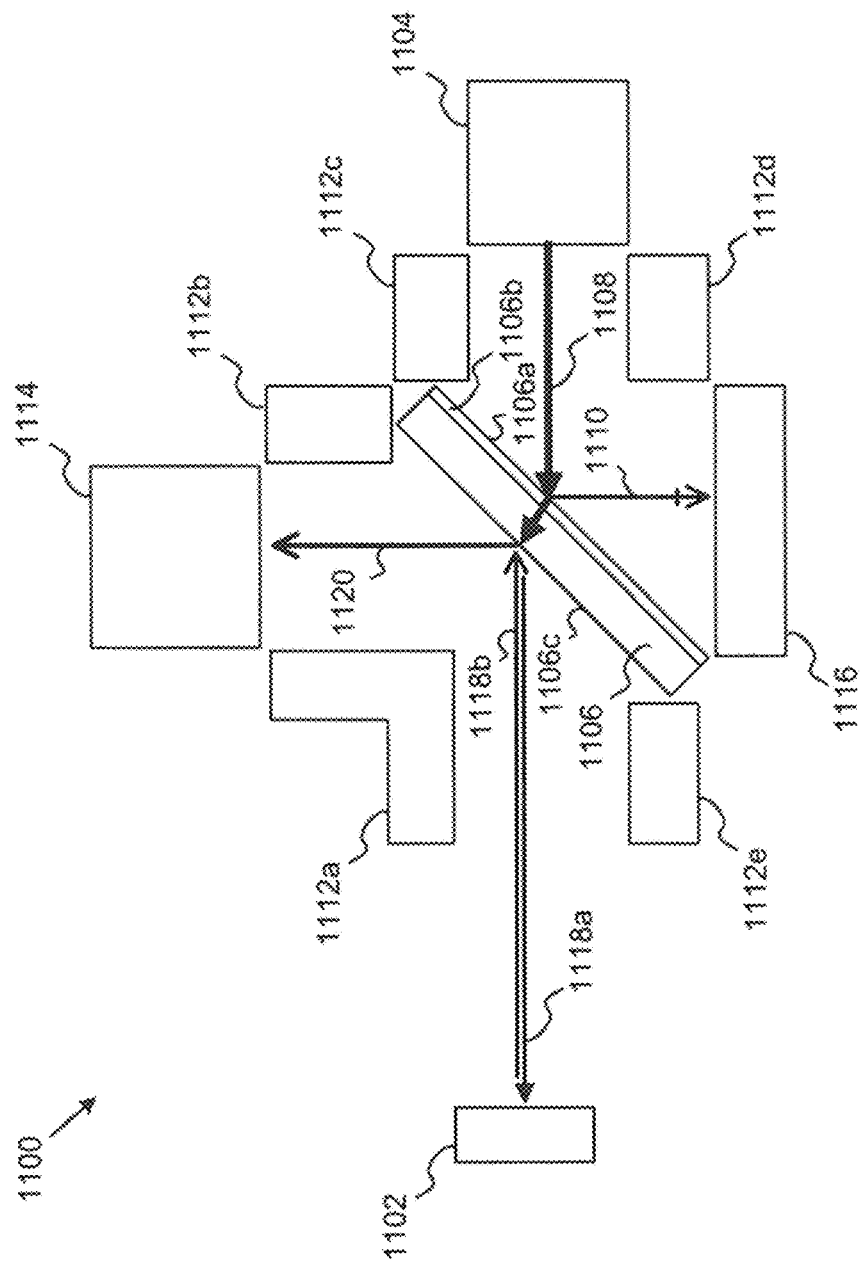
FIG. 11 is an exemplary terahertz sensor system having a terahertz beam splitter with an anti-reflective coating and absorber material.

Referring now to FIG. 11, shown there in is a terahertz sensor system 1100 that includes a double pass THz beam splitter 1106. The double pass THz beam splitter 1106 has a first surface 1106a that is positioned proximal to the transmitter 1104 for receiving the THz pulsed wave 1108 transmitted from the transmitter 1104. That is, the THz pulsed wave transmitted 1108 from the transmitter 1104 is incident on the first surface 1106a. The double pass THz beam splitter 1106 also has a second surface 1106c that is positioned proximal to the receiver 1114 from which the THz pulsed wave 1108 transmitted from the transmitter 1104 exits the double pass THz beam splitter 1106 and travels 1118a to the multi-layer structure 1102 under test. The THz pulsed wave 1118a is reflected at the material-air and multi-layer boundaries to create reflected THz wave pulses 1118b that return to the second surface 1106c of the double pass THz beam splitter 1106. The second surface 1106c reflects the reflected THz pulses 1118b to travel 1120 to the receiver 1114.

To improve the efficiency of the double pass THz beam splitter 1106, the double pass THz beam splitter 1106 can include a single-sided anti-reflection coating 1106b. Such a single-sided anti-reflection coating 1106b can increase the transmission of the THz pulsed wave 1108 transmitted from the transmitter 1104 through a first surface 1106a of the beam splitter 1106, without influencing the returning beam 1118b which only reflects off the second surface 1106c of the beam splitter 1106 to return to the receiver 1114. The anti-reflection coating 1106b can be any appropriate anti-reflection coating material that is compatible with terahertz light. For example, the anti-reflection coating 1106b may be a thin film of polyethylene or parylene.

In a compact industrial package, stray terahertz beam 1110 and noise at frequencies detectable by the receiver 1114 can impact signal quality. To reduce this impact, terahertz absorbing material can be added around the path of the beam. More specifically, absorbing material 1116 may be provided to absorb the stray terahertz beam 1110 generated by the beam splitter 1106. Secondarily, absorbing material 1112a, 1112b, 1112c, 1112d, 1112e (herein collectively referred to as 1112) may be added all around the path of the beam 1108, 1118a, 1118b, and 1120 to attenuate noise and unwanted reflections. Absorbing material 1112 and/or 1116 can be any material with strong terahertz absorption properties. For example, absorbing material 1112 and/or 1116 can be rubber or a metal particle filled rubber product.

In some multi-layer plastic structures, the barriers can be very thin. For example, barriers that are less than 120 micrometers can be considered very thin. However, whether barriers are very thin can depend on the type of material that the barrier is made of. Very thin barriers can result in pulse width overlaps in the reflected pulses. Overlaps can affect the measurement accuracy of the barrier thickness. The method 700 described in FIG. 7 can be inaccurate for determining the thickness of very thin barriers, namely reflected pulses having a pulse width overlap. In such cases, signal processing can be required to extract the barrier reflections and calculate the thicknesses of the individual layers.

Since the shape of the transmitted pulses is known, two reflected pulses coming from two sides of the barrier that are not fully separated in time can be identified as overlapping. The width of an overlap that affects the measurement accuracy can depend on the pulse shape and the pulse width. For example, in some embodiments, overlaps of a picosecond or more can affect the measurement accuracy and in some embodiments, overlaps of less than a picosecond can affect the measurement accuracy.

Figure 12:
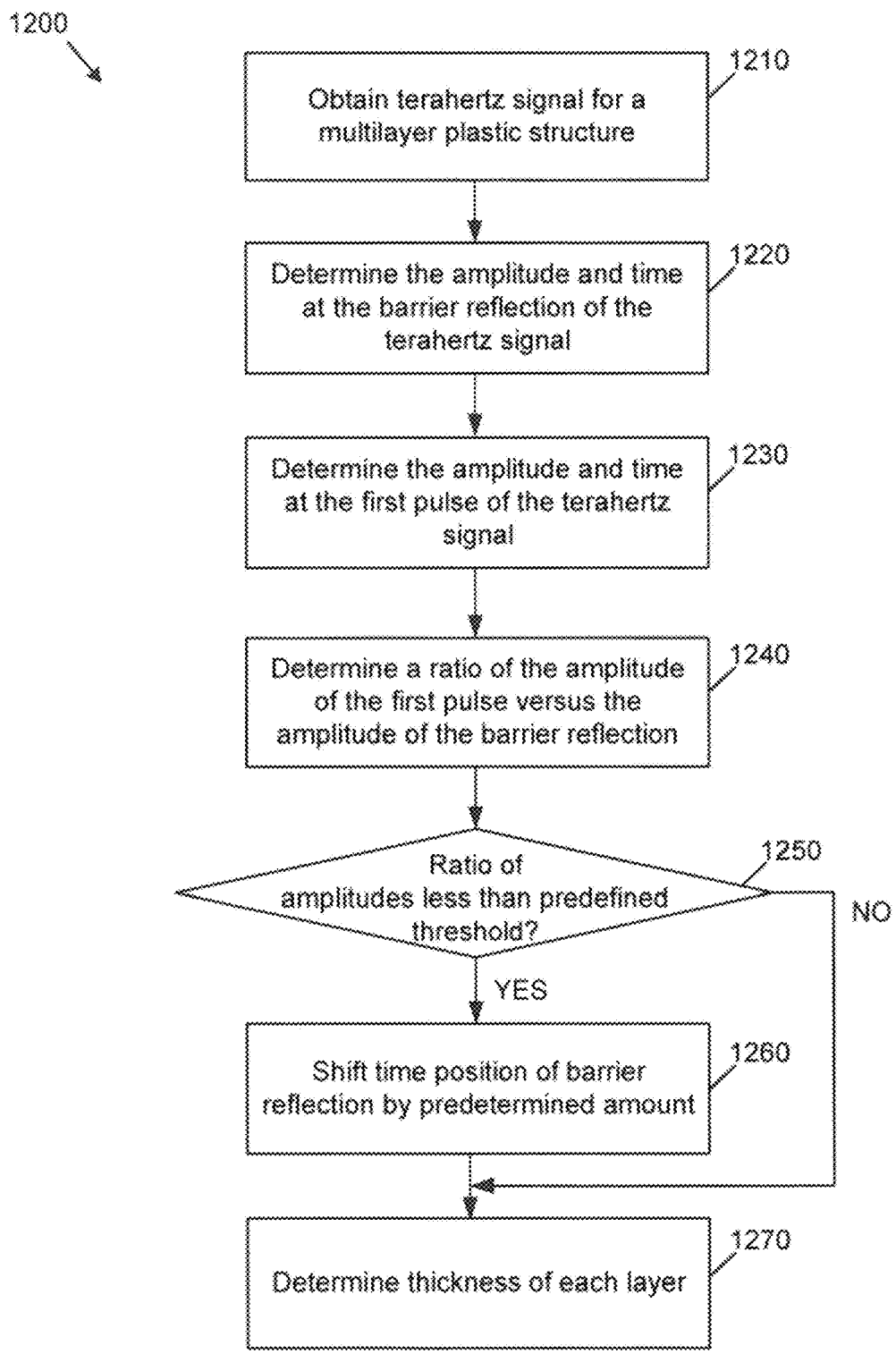
FIG. 12 is a schematic diagram of a method for determining thickness of individual layers and barrier thicknesses in a multilayer plastic product having a thin barrier layer.

Referring now to FIG. 12, illustrated therein is a schematic diagram of a method 1200 to determine the thickness of each layer of a multi-layer plastic structure containing such a thin barrier thickness. The method 1200 begins at 1210 when a terahertz signal for a multi-layer plastic structure is obtained. FIG. 13 shows an example terahertz signal 1300 obtained from a multi-layer structure having a barrier layer between a first and a second layer. Reference will also be made to FIG. 13 to better explain method 1200.

At 1220, the amplitude and time index of a pulse indicative of a barrier reflection 1306 of the terahertz signal 1300 obtained at 1210 is determined. There are various ways to identify a pulse indicative of a barrier reflection 1306. In at least one embodiment, the slope at each sample point can be determined and plotted along the time axis. In some embodiments, only the slopes that are greater than a pre-determined threshold can be plotted along the time-axis. For a multi-layer structure having a barrier layer between a first layer and a second layer such as that used to obtain the terahertz signal 1300 of FIG. 13, the first largest slope, that is, the largest slope on the left of the time axis corresponds to the first reflection as the terahertz signal enters the first layer. Similarly, the last largest slope, that is, the largest slope on the right of the time axis corresponds to the last reflection as the terahertz signal exits the second layer. The largest slope between the first largest slope and the last largest slope, that is, an intermediate largest slope, corresponds to the barrier reflection as the terahertz signal passes through the barrier layer between the first and the second layers.

At 1230, the amplitude and the time index at the first pulse 1302 of the terahertz signal obtained at 1210 is determined. As noted above, the first pulse 1302 corresponds to the first reflection as the terahertz signal enters the first layer.

At 1240, a ratio of the amplitude at the first pulse 1302, determined at 1230, and the amplitude of the pulse indicative of the barrier reflection 1306, determined at 1220, is determined.

At 1250, the ratio determined at 1240 is compared against a predefined threshold. The value of the predefined threshold can vary based on signal attenuation and the type of materials of the multiple layers in the multi-layer structure being tested, including the absorptive properties of the materials. For example, in some embodiments, a ratio of 2.5 can be used for a specific PET product. If the ratio is less than the pre-defined threshold, the method proceeds to 1270.

At 1260, modified terahertz signal is provided by applying a positional time shift to the pulse indicative of a barrier reflection 1306. The positional time shift can be a predetermined amount of time to compensate for overlapping of pulses, that is, to compensate for inaccuracy in the peak position. The value for the positional time shift can vary based on the specific multi-layer structure being tested, that is the multiple layers of materials in the multi-layer structure, including the barrier thickness within the multi-layer structure. In some embodiments, the value for the positional time shift can be determined from an experimental formula. Furthermore, while the positional time shift is generally applied to shift the barrier reflection right along the time axis, in some embodiments, the positional time shift can be applied to shift the barrier reflection left along the time axis. The remainder of the terahertz signal, that is the all portions of the terahertz signal except the pulse indicative of the barrier reflection, remains the same, that is, without a positional time shift.

At 1270, the thickness of each layer can be determined based on the modified terahertz signal provided by 1260. As a result of shifting the barrier reflection, the pulse width overlap can be reduced and the measurement accuracy is improved.

If the ratio of amplitudes is determined to be less than the predefined threshold at 1250, the original terahertz signal of 1210 is provided as the modified terahertz signal and the thickness of each layer can be determined based on the modified terahertz signal, that is the original terahertz signal of 1210.

Referring now to FIG. 13, shown therein are measurement results 1300 collected from a receiver, such as receiver 1114, obtained from a multi-layer structure having a barrier layer between a first and a second layer and a transmitter, such as transmitter 1108, transmitting a bipolar THz pulsed wave.

As shown in FIG. 13, the measurement results include a first peak 1302, a second peak 1304, a third peak 1306, a fourth peak 1308, a fifth peak 1310, and a sixth peak 1312. The first peak 1302 and the second peak 1304 are the left most peaks along the time axis, that is, the first peaks, and correspond to the reflection of the THz pulse wave entering the first layer of the multi-layer structure. The fifth peak 1310 and the sixth peak 1312 are the right most peaks along the time axis, that is, the last peaks, and correspond to the reflection of the THz pulse wave exiting the second layer of the multi-layer structure. As shown in FIG. 13, the polarity of the fifth peak 1310 and the sixth peak 1312 is the opposite of the first peak 1302 and the second peak 1304 because the fifth peak 1310 and the sixth peak 1312 correspond a transition from plastic (i.e., the second layer) to air while the first peak 1302 and the second peak 1304 correspond to a transition from air to plastic (i.e., the first layer). The third peak 1306 and the fourth peak 108, that is, the intermediate peaks, correspond to the reflection of the THz pulse wave in the barrier layer.

The method of 1200 can be applied to determine that an overlap exists between the third peak 1306 and the fourth peak 1308 and calculate the positional time shift values and shift the third peak 1306 and the fourth peak 1308 along the time axis. As noted above, the positional time shift is provided to compensate for inaccuracy of the positions of peaks 1306 and 1308 as a result of the overlap.

While the above description includes a number of exemplary embodiments, many modifications, substitutions, changes and equivalents will be obvious to persons having ordinary skill in the art.

While the above description provides examples of one or more apparatus, methods, or systems, it will be appreciated that other apparatus, methods, or systems may be within the scope of the claims as interpreted by one of skill in the art.

The invention claimed is:

1. A method for measuring thicknesses of layers of a multi-layered structure, the method comprising:
   generating a terahertz wave pulse;
   transmitting the terahertz wave pulse to the multi-layered structure having multiple layers of materials;
   receiving reflected terahertz wave pulses reflected by boundaries between the multiple layers as the terahertz wave pulse penetrates the multi-layered structure; and
   operating a processor to:
   (i) determine if two or more of the reflected terahertz wave pulses are not clear due to a pulse width overlap resulting from the two or more reflected terahertz wave pulses not being fully separated in time;
   (ii) in response to determining that the reflected terahertz wave pulses are not clear, process the reflected terahertz wave pulses to obtain modified reflected terahertz wave pulses;
   (iii) measure time delays associated with each of the modified reflected terahertz pulses; and
   (iv) determine a thickness of each of the multiple layers of materials based upon the time delays and a material refractive index of each of the materials.

2. The method of claim 1, wherein processing the reflected terahertz wave pulses to obtain modified reflected terahertz wave pulses comprises:
   determining an amplitude and time of a pulse of the reflected terahertz wave pulses indicative of a barrier reflection;
   determining an amplitude and time of a first pulse of the reflected terahertz wave pulses;
   determining a ratio of the amplitude of the first pulse to the amplitude of the pulse indicative of the barrier reflection; and
   in response to determining that the ratio of the amplitude of the first pulse to the amplitude of the pulse indicative of the barrier reflection is less than a predefined threshold, time shifting the pulse indicative of the barrier reflection by a predetermined amount and retaining a remaining portion of the reflected terahertz wave pulses to provide the modified reflected terahertz wave pulses; and in response to determining that the ratio of the amplitude of the first pulse to the barrier reflection is greater than the predefined threshold, providing the reflected terahertz wave pulses as the modified reflected terahertz wave pulses.

3. The method of claim 2, wherein time shifting the pulse indicative of the barrier reflection by the predetermined amount comprises determining the width of the pulse indicative of the barrier reflection.

4. The method of claim 2, wherein the predetermined amount is based on the multiple layers of materials of the multi-layer structure.

5. The method of claim 2, wherein the predefined threshold is based on at least one of signal attenuation and type of materials of the multiple layers in the multi-layer structure.

6. The method of claim 2, wherein the multi-layer structure comprises a multi-layer plastic structure, the multi-layer plastic structure comprising a barrier layer between a first layer and a second layer, the barrier layer comprising a thickness of less than about 120 micrometers.

7. The method of claim 6, wherein determining an amplitude and time of a pulse of the reflected terahertz wave pulses indicative of a barrier reflection comprises determining the amplitude of the pulse the reflected terahertz wave pulses at an intermediate largest slope, the intermediate largest slope being between a first largest slope and a last largest slope.

8. The method of claim 6, wherein determining an amplitude and time of a first pulse of the reflected terahertz wave pulses comprises determining the amplitude of the pulse the reflected terahertz wave pulses at a first largest slope.

9. The method of claim 1, further comprises operating the processor to eliminate noise by digital averaging the reflected terahertz wave pulses.

10. The method of claim 9, wherein digital averaging of the reflected terahertz wave pulses is determined based on $$\frac{x((m*n-n)+1)}{n} + \frac{x((m*n-n)+2)}{n} + \cdots + \frac{x(m*n)}{n},$$

x is value of a digital sample of the reflected terahertz wave pulses, n is a total number of digital samples of the reflected terahertz wave pulses, and m is an integer value.

11. A system for measuring thicknesses of layers of a multi-layered structure, the system comprising:

a driver for producing a terahertz wave pulse;

a terahertz photoconductive transmitter for transmitting the terahertz wave pulse to the structure having multiple layers of materials;

a terahertz photoconductive receiver for receiving reflected terahertz wave pulses reflected by boundaries between the multiple layers as the terahertz wave pulse penetrates the multi-layered structure and by a double-pass terahertz beam splitter;

the double-pass terahertz beam splitter having a first surface proximal to the terahertz photoconductive transmitter and a second surface proximal to the terahertz photoconductive receiver, the terahertz pulse wave transmitted from the terahertz photoconductive transmitter being incident on the first surface, the reflected terahertz wave pulses from the multi-layered structure being incident on the second surface and reflected to the terahertz photoconductive receiver; and a processor for processing the reflected terahertz wave pulses to: (i) measure time delays associated with each of the reflected terahertz pulses and (ii) determine a thickness of each of the multiple layers of materials based upon the time delays and a material refractive index of each of the materials.

12. The system of claim 11, wherein the double-pass terahertz beam splitter comprises a single-sided anti-reflection coating on the first surface.

13. The system of claim 12, wherein the single-sided anti-reflection coating is compatible with terahertz light.

14. The system of claim 12, wherein the single-sided anti-reflection coating comprises at least one of polyethylene and parylene.

15. The system of claim 11, further comprising absorbing material proximal to the first surface for absorbing stray beam generated from the terahertz pulse wave from the terahertz photoconductive transmitter being incident on double-pass terahertz beam splitter.

16. The system of claim 15, wherein the absorbing material comprises at least one of rubber and a metal particle filled rubber product.

17. The system of claim 11, further comprising absorbing material around the path of the first and second wave beams to attenuate noise and unwanted reflection.

18. The system of claim 17, wherein the absorbing material comprises at least one of rubber and a metal particle filled rubber product.

19. The system of claim 11, wherein the multi-layer structure comprises a multi-layer plastic structure, the multi-layer plastic structure comprising a barrier layer between a first layer and a second layer, the barrier layer comprising a thickness less than about 120 micrometers.

* * * * *